(12) United States Patent
Kim

(10) Patent No.: US 9,991,830 B2
(45) Date of Patent: Jun. 5, 2018

(54) CONTROL METHOD FOR MOTOR OF ELECTRONIC BRAKE

(71) Applicant: HYUNDAI MOBIS CO., LTD., Seoul (KR)

(72) Inventor: Do Kun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 50 days.

(21) Appl. No.: 15/209,528

(22) Filed: Jul. 13, 2016

(65) Prior Publication Data

US 2017/0016498 A1 Jan. 19, 2017

(30) Foreign Application Priority Data

Jul. 13, 2015 (KR) .................. 10-2015-0099017

(51) Int. Cl.
- *H02P 6/28* (2016.01)
- *B60T 8/171* (2006.01)
- *H02P 6/08* (2016.01)
- *B60T 7/04* (2006.01)
- *B60T 17/22* (2006.01)
- *B60T 8/88* (2006.01)
- *F16D 121/24* (2012.01)

(52) U.S. Cl.
CPC ................ *H02P 6/28* (2016.02); *B60T 7/042* (2013.01); *B60T 8/171* (2013.01); *B60T 8/885* (2013.01); *B60T 17/221* (2013.01); *H02P 6/08* (2013.01); *B60T 2220/04* (2013.01); *B60T 2270/413* (2013.01); *F16D 2121/24* (2013.01)

(58) Field of Classification Search
CPC ... H02P 6/28; H02P 6/08; B60T 7/042; B60T 8/171; B60T 8/885; B60T 17/221; B60T 13/741; F16D 2121/24
See application file for complete search history.

(56) References Cited

U.S. PATENT DOCUMENTS

| | | | | |
|---|---|---|---|---|
| 2011/0246039 A1* | 10/2011 | Takeda | .................. | B60T 13/741 701/70 |
| 2016/0009260 A1* | 1/2016 | Kim | ........................ | B60T 8/885 701/70 |

FOREIGN PATENT DOCUMENTS

KR 10-2013-0117235 A 10/2013

* cited by examiner

*Primary Examiner* — Melanie Torres Williams
(74) *Attorney, Agent, or Firm* — Knobbe Martens Olson & Bear LLP

(57) ABSTRACT

Disclosed is a control method for a motor of an electronic brake. The control method for a motor of an electronic brake includes: a stop mode-starting step of starting a stop mode when a vehicle is stopped by a brake; an electrical angle-measuring step of measuring an electrical angle of a motor providing pressure to the brake in the stop mode; an electrical angle-calculating step of calculating a changed electrical angle using a predetermined electrical angle change and the electrical angle of the motor measured in the electrical angle-measuring step; and a motor-controlling step of controlling a current flowing to the motor in accordance with the changed electrical angle. Therefore, it is possible to keep a vehicle stopped, prevent a high current from flowing at any one phase of the motor, and prevent the motor from burning.

7 Claims, 4 Drawing Sheets

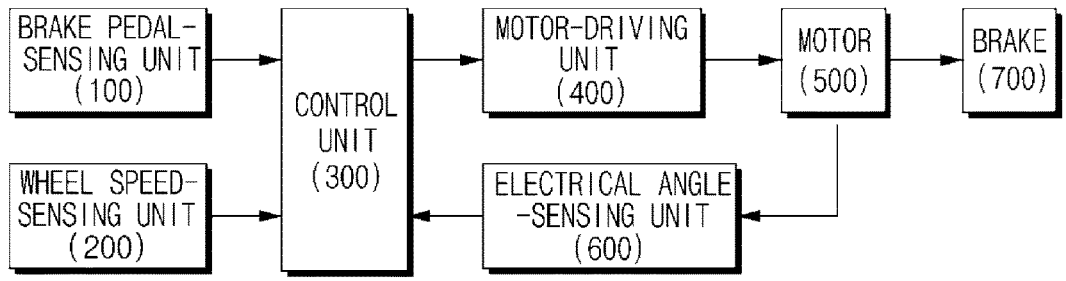
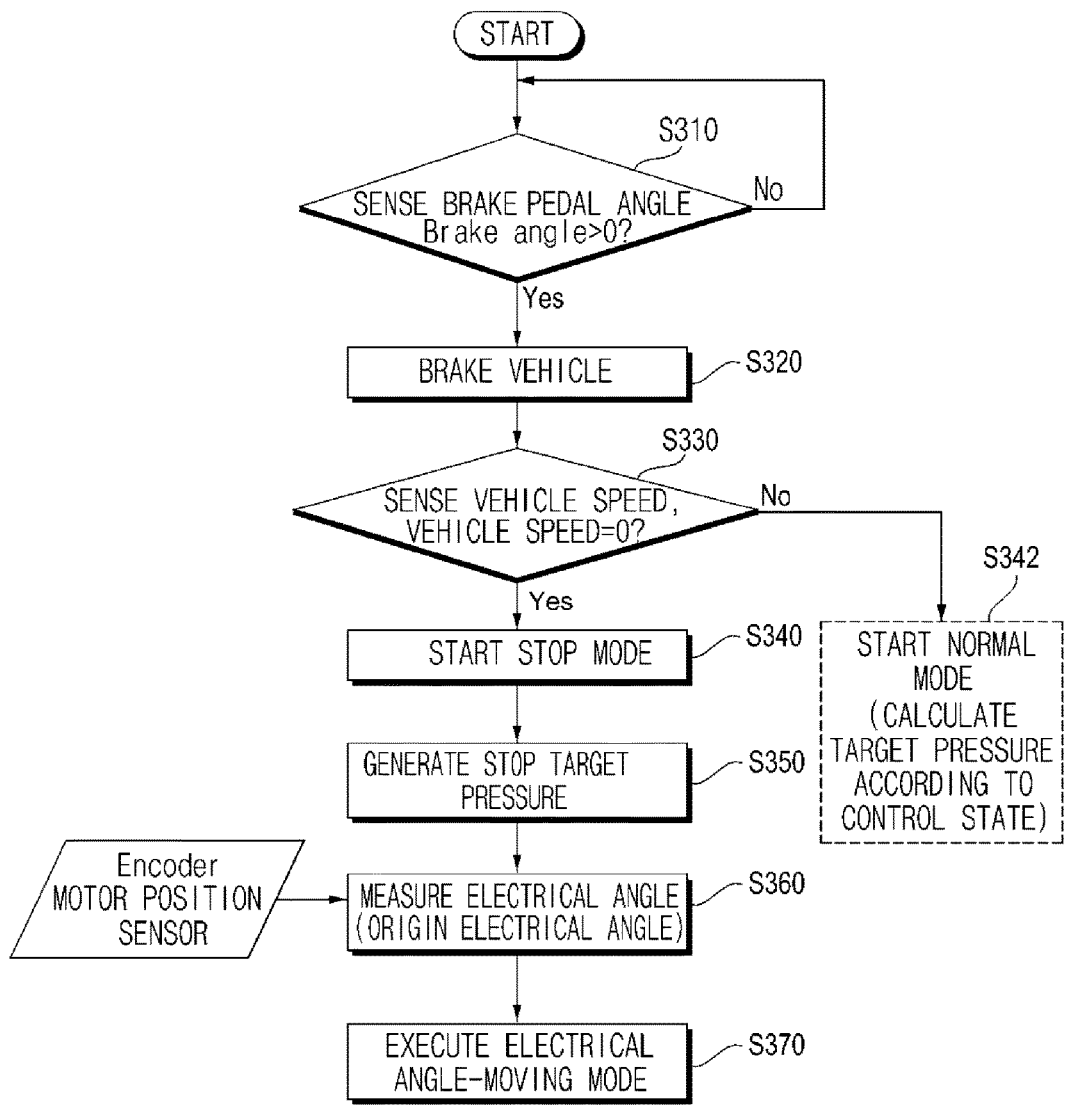

CONTROL METHOD FOR MOTOR OF ELECTRONIC BRAKE

CROSS-REFERENCE TO RELATED APPLICATIONS

This application claims priority to and the benefit of Korean Patent Application No. 10-2015-0099017 filed in the Korean Intellectual Property Office on Jul. 13, 2015, the entire contents of which are incorporated herein by reference.

TECHNICAL FIELD

The present disclosure relates to a control method for a motor of an electronic brake.

BACKGROUND

An electronic brake is a device that measures an electrical angle and a current supplied to a motor, generates torque by operating the motor by controlling a current flowing to the motor in accordance with the measured electrical angle, converts the torque into brake pressure through a gear, and brakes a vehicle using the converted brake pressure.

Recently, laws and regulations regarding a brake have been revised to be more severe due to an increase of vehicle accidents, so it is required to increase the pressure of a brake for stopping a vehicle, which was 50 bar, to 90 bar in order to satisfy the revised laws and regulations regarding a brake.

SUMMARY

An aspect of the present invention provides a control method for a motor of an electronic brake that can keep a vehicle stopped while preventing long-time concentration of a current at any one phase of a motor and can prevent burning of a FET and malfunction of a brake.

An embodiment of the present invention provides a control method for a motor of an electronic brake that includes: a stop mode-starting step of starting a stop mode when a vehicle is stopped by a brake; an electrical angle-measuring step of measuring an electrical angle of a motor providing pressure to the brake in the stop mode; an electrical angle-calculating step of calculating a changed electrical angle using a predetermined electrical angle change and the electrical angle of the motor measured in the electrical angle-measuring step; and a motor-controlling step of controlling a current flowing to the motor in accordance with the changed electrical angle.

The method may further include: before the stop mode-starting step, a brake pedal angle-sensing step of sensing an angle of a brake pedal of the vehicle; a braking step of braking the vehicle using the brake when the angle of the brake pedal exceeds 0 degree; and a vehicle speed-sensing step of sensing the speed of the vehicle to check whether the vehicle has been stopped by the braking step.

The method may further include a target pressure-generating step of generating target pressure of the brake for keeping the vehicle stopped in stop mode.

The method may further include an electrical angle-moving mode-selecting step of selecting and executing any one of a first electrical angle-moving mode and a second electrical angle-moving mode after the electrical angle-measuring step, in which the electrical angle-calculating step may be performed in an electrical angle-moving mode selected from the first electrical angle-moving mode for calculating the changed electrical angle by subtracting the electrical angle change from the electrical angle of the motor and the second electrical angle-moving mode for calculating the changed electrical angle by adding the electrical angle change to the electrical angle of the motor.

The method may further include a step of generating a target current of a motor corresponding to target pressure of the brake, in which the motor-controlling step performs PWM control on the motor in accordance with the target current and the changed electrical angle.

The method may further include: a current-checking step of checking a current error by comparing feedback current of the motor with the target current of the motor; and a pressure-checking step of checking a pressure error by comparing the feedback pressure of the brake with the target pressure of the brake.

The method may further include an electrical angle-moving mode-changing step that, after the motor-controlling step, changes the mode to the second electrical angle-moving mode when the electrical angle-moving mode is the first electrical angle-moving mode and the changed electrical angle exceeds 90 degrees from the measured electrical angle of the motor, and that changes the mode to the first electrical angle-moving mode when the electrical angle-moving mode is the second electrical angle-moving mode and the changed electrical angle exceeds 90 degrees from the measured electrical angle of the motor.

The target pressure of the brake may be 90 bar or more.

An electrical angle range where the changed electrical angle is calculated may be −90 degrees to +90 degrees from the measured electrical angle of the motor.

Therefore, according to the control method for a motor of an electronic brake of an embodiment of the present invention, it is possible to keep a vehicle stopped while preventing concentration of a current at any one phase of a motor with a brake pedal keeping pressed down by a user.

Further, since a current is not concentrated at any one phase of a motor, it is possible to increase the lifespan and performance of a FET used for supplying a current to the motor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a block diagram of an electronic brake according to an embodiment of the present invention.

FIG. 3 is a flowchart illustrating a control method for a motor of an electronic brake according to an embodiment of the present invention.

Figure 1:
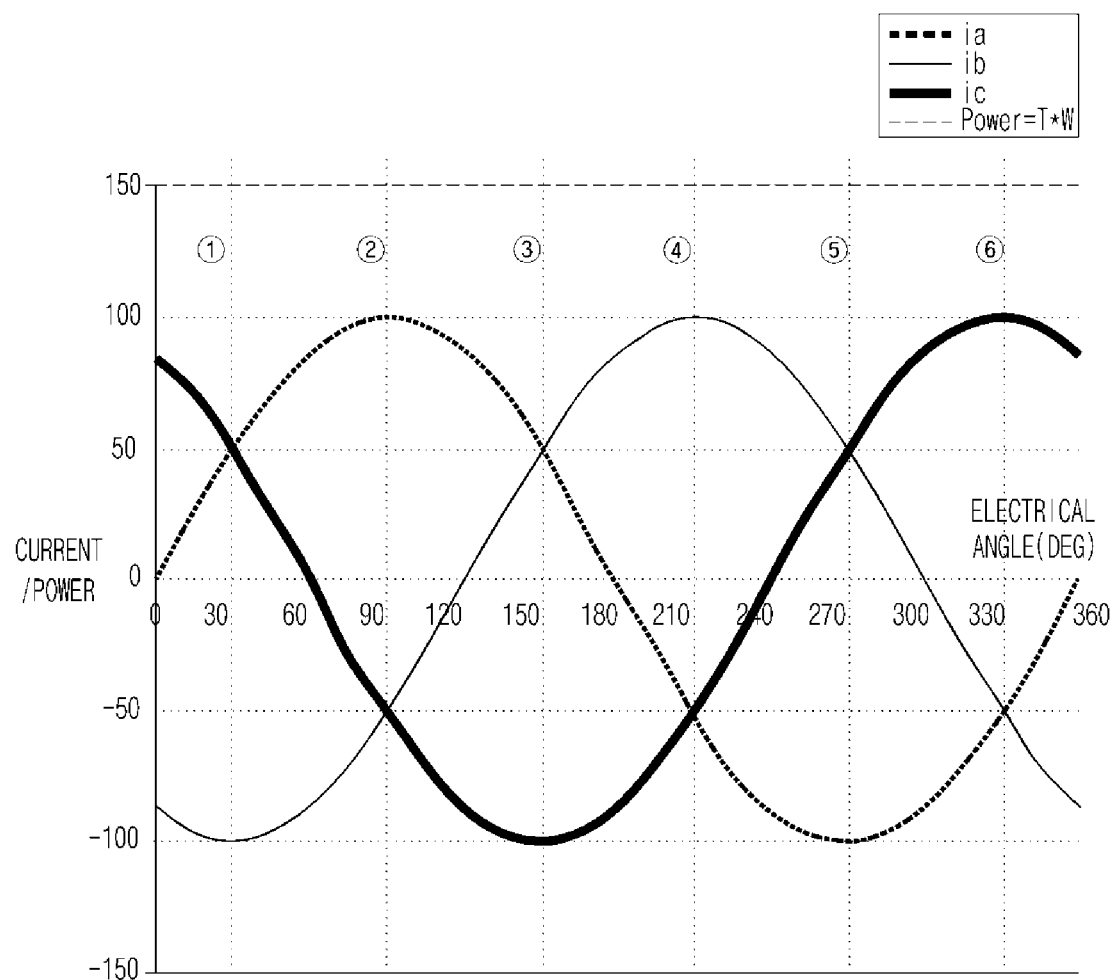
FIG. 1 is a diagram illustrating a current flowing in a 3-phase motor of an electronic brake.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is necessary to refer to the accompanying drawings showing embodiments of the present invention and those shown in the drawings in order to fully understand the present invention, operational advantages of the present invention, and objects accomplished by implementing the present invention.

The present invention is described hereafter in detail by describing embodiments of the present invention with reference to the accompanying drawings. However, the present invention may be implemented in various ways and is not limited to the embodiments described herein. Further, for clear description of embodiments of the present invention, parts not related to the description are not stated and the same reference numerals indicate the same components in the drawings.

Further, throughout the specification, unless explicitly described otherwise, "comprising" any components will be understood to imply the inclusion of other components rather than the exclusion of any other components. Further, in the specification, the terms "~ unit", "~ er", "module", and "block" mean one unit for processing at least one function or operation and may be achieved by hardware, software, or a combination of hardware and software.

Generally, in order to increase the pressure of a brake, it is required to increase the current flowing to a motor that provides pressure of the brake.

Referring to FIG. 1, currents ia, ib, and ic supplied at phases (a-phase, b-phase, and c-phase) and torque (Power=T×W) generated at the phases when the motor for an electronic brake for generating brake pressure of 90 bar can be seen. The waveforms of the phases show the intensity and direction of the current flowing in accordance with the horizontal axis (electrical angle).

For example, in order to brake a vehicle, a user stops the vehicle by pressing down a brake pedal. In this case, it is required to keep the vehicle stopped with brake pressure of 90 bar under the revised laws and regulations and an electronic brake supplies a current corresponding to the brake pressure to a motor in accordance with an electrical angle of the motor and converts predetermined motor torque generated by the motor rotated by the current into the brake pressure, so it can keep the vehicle stopped using the converted brake pressure.

In this case, the motor that generates predetermined torque generates pressure by operating a master cylinder of the electronic brake and stops when the pressure of the master cylinder reaches necessary pressure. If a driver keeps pressing down the brake pedal, the motor has to keep generating torque in order to keep the vehicle stopped, and accordingly, a current corresponding to the brake pressure keeps flowing to the motor stopped at any one of electrical angles of 0 to 360 degrees.

For example, when a motor stops at electrical angles corresponding to peaks 100A and −100A of phases, a current is concentrated to the motor at only any one of the phases.

When a current is concentrated to the motor at only any one of the phases, excessive heat is generated by a large current in an FET (Field Effect Transistor) used for supplying a current to the motor, so durability of the FET is considerably decreased and may consequently be burned.

Accordingly, when a user keeps a vehicle stopped for a long time with increased brake pressure, an FET is burned by an increase in current consumed by a motor and a critical defect that a brake does not operate may be caused due to burning of the FET.

Referring to FIG. 2, an electronic brake system according to an embodiment of the present invention includes a brake pedal-sensing unit 100, a wheel speed-sensing unit 200, a control unit 300, a motor-driving unit 400, a motor 500, an electrical angle-sensing unit 600, and a brake 700, in which when the brake pedal-sensing unit 100 senses operation of a brake pedal, the control unit 300 brakes a vehicle using the brake 700 and, when the wheel speed-sensing unit 200 senses the speed of a vehicle, the control unit 300 checks that the vehicle has completely stopped on the basis of the speed of the vehicle, the electrical angle-sensing unit 600 measures an electrical angle of a motor that has stopped rotating with stop of the vehicle, the control unit 300 changes the measured electrical angle of the motor within a predetermined electrical angle range and controls the motor-driving unit 400 in accordance with the changed electrical angle, the motor-driving unit 400 is controlled to supply a current to the motor 500 by the control unit 300, the motor 500 continuously generates same torque using the current supplied in accordance with the changed electrical angle, and the brake 700 converts the torque from the motor 500 into pressure and brakes the vehicle.

Accordingly, with the vehicle completely stopped and the brake pedal pressed down, the electronic brake system freely changes the electrical angle of the motor that has stopped rotating and the motor is controlled in accordance with the changed electrical angle, whereby it is possible to keep the vehicle stopped while preventing a high current from concentrating at any one phase of the motor, and accordingly, it is possible to prevent the motor driving unit, the motor, and the like from burning.

Hereafter, a control method for a motor of an electronic brake using various components of an electronic brake system is described with reference to FIGS. 3 and 4.

Figure 4:
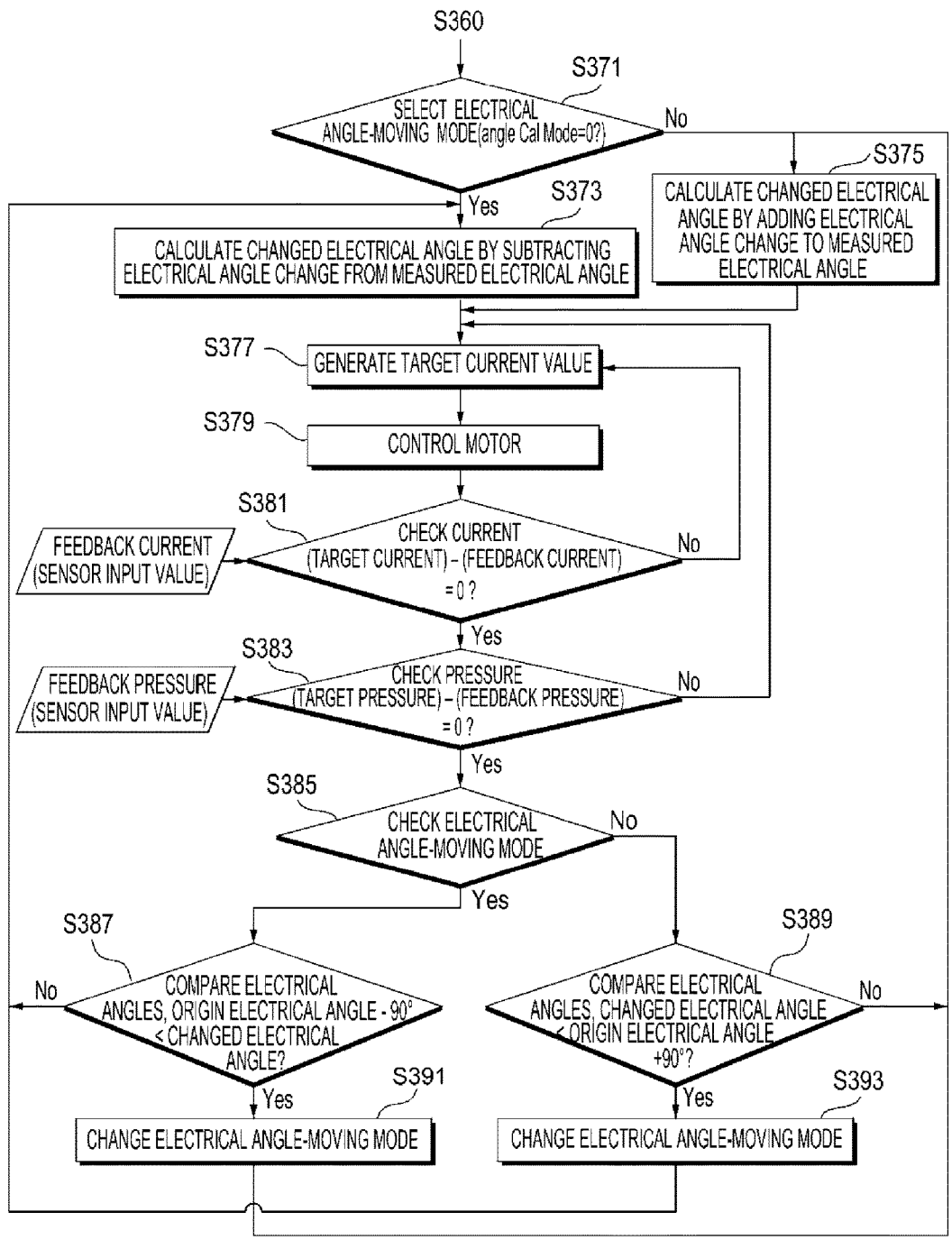
FIG. 4 is a diagram illustrating an electrical angle range of a motor of an electronic brake according to an embodiment of the present invention.

Referring to FIGS. 3 and 4, a control method for a motor of an electronic brake according to an embodiment of the present invention may include a brake pedal angle-sensing step S310, a braking step S320, a vehicle speed-sensing step S330, a stop mode-starting step S340, a target pressure-generating step S350, an electrical angle-measuring step S360, and an electrical angle-moving mode-executing step S370.

In the control method for a motor of an electronic brake according to an embodiment of the present invention, first, the brake pedal-sensing unit 100 senses the angle of a brake pedal of a vehicle in the brake pedal angle-sensing step S310. The brake pedal is pressed by a driver and the angle of the brake pedal can be changed correspondingly. When a change in angle of the brake pedal is sensed, the brake pedal-sensing unit 100 can send out a pedal-sensing signal to the control unit 300.

Thereafter, the control unit 300 brakes the vehicle by operating the brake 700 in response to the pedal-sensing signal in the braking step S320. Herein, when the angle of the brake pedal sensed in the brake pedal angle-sensing step exceeds 0 degree, the control unit 300 can operate the brake 700. The brake 700 may be a drum type or disc type brake known in the art. As the brake 700 is operated, the vehicle can be gradually reduced in speed and stopped consequently.

Next, the wheel speed-sensing unit 200 senses the speed of the vehicle in the vehicle speed-sensing step S330. The wheel speed-sensing unit 200 can transmit the sensed vehicle speed to the control unit 300.

Next, when the control unit 300 makes sure that the vehicle speed transmitted from the wheel speed-sensing unit 200 is 0, the vehicle is determined as being stopped. and a stop mode is started in the stop mode-starting step S340. Herein, when the vehicle speed is not 0, the control unit 300 determines that the vehicle has not been stopped and a normal mode is started (S342). A target pressure of the brake may be calculated in accordance with the control state of the vehicle in the normal mode.

Next, in the stop mode, the target pressure-generating step S350 is started and a target pressure (stop target pressure) of the brake required by the control unit 300 to keep the vehicle stopped is generated. Herein, the target pressure of the brake is set 90 bar or more. This is a value set under laws and regulations regarding an automotive brake that have been recently revised.

Next, the electrical angle-sensing unit 600 measures the electrical angle (origin electrical angle) of the motor in the electrical angle-measuring step S360. Herein, the electrical angle-sensing unit 600 may be an encoder or a motor position sensor. Further, since the motor supplying pressure to the brake of the stopped vehicle has been stopped, the electrical angle of the motor measured by the electrical angle-sensing unit 600 is any one between 0 and 360 degrees. The control unit 300 appropriately supplies a current at the phases of the motor in accordance with the electrical angle of the motor, which has stopped rotating, by controlling the motor-driving unit 400.

For example, when the electrical angle of the motor measured by the electrical angle-sensing unit 600 is 90 degrees, a current corresponding to a peak may be supplied at the a-phase of the motor, and if the user does not take a foot off the brake pedal, the current corresponding to the peak concentrates at any one phase (a-phase) of the motor for a long time, which causes the motor 500 and the motor-driving unit 400 to burn.

Accordingly, the control method for a motor of an electronic brake according to an embodiment of the present invention further includes an electrical angle-moving mode-executing step S370. Therefore, even if a user keeps pressing down a brake pedal in a vehicle that has stopped, it is possible to prevent the current corresponding to a peak from keeping flowing at any one of three phases of the motor by freely and continuously changing the electrical angle of the motor to other electrical angles and controlling the current flowing to the motor at each phase in accordance with the changed electrical angle of the motor.

Hereafter, the electrical angle-moving mode-executing step S370 is described in detail with reference to FIG. 4. After the electrical angle-measuring step S360, the electrical angle-moving mode-executing step S370 is performed and the electrical angle-moving mode-executing step S370 may include an electrical angle-moving mode-selecting step S371, electrical angle-calculating steps S373 and S375, a target current-generating step S377, a motor-controlling step S379, a current-checking step S381, a pressure-checking step S383, an electrical angle-moving mode-checking step S385, comparing steps S387 and S389, and electrical angle-moving mode-changing steps S391 and S393.

First, in the electrical angle-moving mode-selecting step S371, the control unit 300 freely selects any one of a first electrical angle-moving mode and a second electrical angle-moving mode. Herein, the first electrical angle-moving mode and the second electrical angle-moving mode are modes that can change an electrical angle in different ways and can control the motor in accordance with the electrical angles changed in different ways. A mode value (Angle cal Mode) of the first electrical angle-moving mode may be defined as 0 and a mode value of the second electrical angle-moving mode may be defined as 1.

Hereafter, a case when the first electrical angle-moving mode is described first and then a case when the second electrical angle-moving mode is described.

When the first electrical angle-moving mode is selected, the control unit 300 changes the electrical angle of the motor within a predetermined electrical angle range in the electrical angle-calculating step S373. That is, the control unit 300 can calculate a changed electrical angle by subtracting a predetermined electrical angle change from a calculated electrical angle of the motor. Herein, the electrical angle range may be set as a range where mechanical rotation of the motor by a change in electrical angle does not influence the electronic brake system, and accordingly, the electrical angle range may be set from −90 degrees to +90 degrees from the electrical angle of the motor measured by the electrical angle-sensing unit 600. The electrical angle change may be appropriately set in accordance with a need by a user.

Next, the control unit 300 generates a target current of the motor corresponding to the target pressure of the brake described above in the target current-generating step S377.

Thereafter, the control unit 300 controls the current flowing to the motor in accordance with the changed electrical angle and the target current of the motor in the motor-controlling step S379. Herein, the control unit 300 can generate a PWM signal in accordance with the changed electrical angle and the target current of the motor and can output the PWM signal to the motor-driving unit 400. The motor-driving unit 400 can supply the target current corresponding to the target pressure to the motor 500 in response to the PWM signal.

The motor-driving unit 400 may include a plurality of FETs (Field Effect Transistor). The plurality of FETs can supply a current to the motor at the phases by switching in response to the PWM signal.

Next, the control unit 300 checks a current error by comparing a feedback current (sensor input value) of the motor with the target current of the motor in the current-checking step S381.

Next, the control unit 300 checks a pressure error by comparing feedback pressure (sensor input value) of the motor with the target pressure of the motor in the pressure-checking step S383. Herein, the feedback current and the feedback pressure in the steps S381 and S383 are measured by a current sensor and a pressure sensor. Further, when the feedback current and the feedback pressure do not reach the target current and the target pressure of the motor, the process returns to the step S377, and a current error and a pressure error are checked again after the steps S377 and S379.

When there is no problem with the feedback current and the feedback pressure in the steps S381 and S383, the control unit 300 checks whether it is the first electrical angle-moving mode or the second electrical angle-moving mode in the electrical angle-moving mode-checking step S385.

When the first electrical angle-moving mode is being executed, the control unit 300 checks whether the changed electrical angle exceeds 90 degrees from the electrical angle (origin electrical angle) of the motor before being changed, in the comparing step S387.

Next, when the changed electrical angle exceeds 90 degrees from the electrical angle of the motor before being changed, the control unit 300 changes the first electrical angle-moving mode to the second electrical angle-moving mode in the electrical angle-moving mode-changing step S391. That is, the mode value of the electrical angle-moving mode is changed to 1. After the control unit 300 changes the mode to the second electrical angle-moving mode, the process goes to the second electrical angle-calculating step S375.

Further, when the changed electrical angle does not exceed 90 degrees from the electrical angle of the motor before being changed, the process returns to the electrical angle-calculating step S373, a new changed electrical angle is calculated by subtracting an electrical angle change from the changed electrical angle in the electrical angle-calculating step S373, and then the process after the step S373 is performed again. Accordingly, the electrical angle of the motor can be changed up to one end of the electrical angle range by repeating the process from the step S373 to the step S391.

Hereafter, the process after the electrical angle-calculating step S375 is described.

When the mode is changed to the second electrical angle-moving mode after the step S371 or the step S391, the control unit 300 changes the electrical angle of the motor within a predetermined electrical angle range in the electrical angle-calculating step S375. That is, the control unit 300 can calculate a changed electrical angle by adding a predetermined electrical angle change to the electrical angle of the motor.

Thereafter, the process progresses from the step S377 to the S385 and the control unit 300 checks whether it is the first electrical angle-moving mode or the second electrical angle-moving mode in the electrical angle-moving mode-checking step S385.

When the second electrical angle-moving mode is being executed, the control unit 300 checks whether the changed electrical angle exceeds 90 degrees from the electrical angle (origin electrical angle) of the motor before being changed, in the comparing step S389.

Next, when the changed electrical angle exceeds 90 degrees from the electrical angle of the motor before being changed, the control unit 300 changes the second electrical angle-moving mode to the first electrical angle-moving mode in the electrical angle-moving mode-changing step S393. That is, the mode value of the electrical angle-moving mode is changed to 0. After the control unit 300 changes the mode to the first electrical angle-moving mode, the process goes to the first electrical angle-calculating step S373.

Further, when the changed electrical angle does not exceed 90 degrees from the electrical angle of the motor before being changed, the process returns to the electrical angle-calculating step S375, a new changed electrical angle is calculated by adding an electrical angle change to the changed electrical angle in the electrical angle-calculating step S375, and then the process after the step S375 is performed again. Accordingly, the electrical angle of the motor can be changed up to the other end of the electrical angle range described above by repeating the process from the step S375 to the step S393.

Next, the electrical angle-moving mode-executing step S370 can be repeated if the vehicle is stopped and the brake pedal keeps being pressed down, and then when an external interrupt signal is generated due to non-operation of the brake pedal, the electrical angle-moving mode-executing step S370 can be stopped.

Accordingly, the control method for a motor of an electronic brake according to an embodiment of the present invention changes the electrical angle of a motor within a predetermined electrical angle range, whereby even if a user keeps pressing down a brake pedal in a vehicle that has been stopped, it is possible to prevent excessive current from flowing at any one of three phases of the motor.

Figure 5:
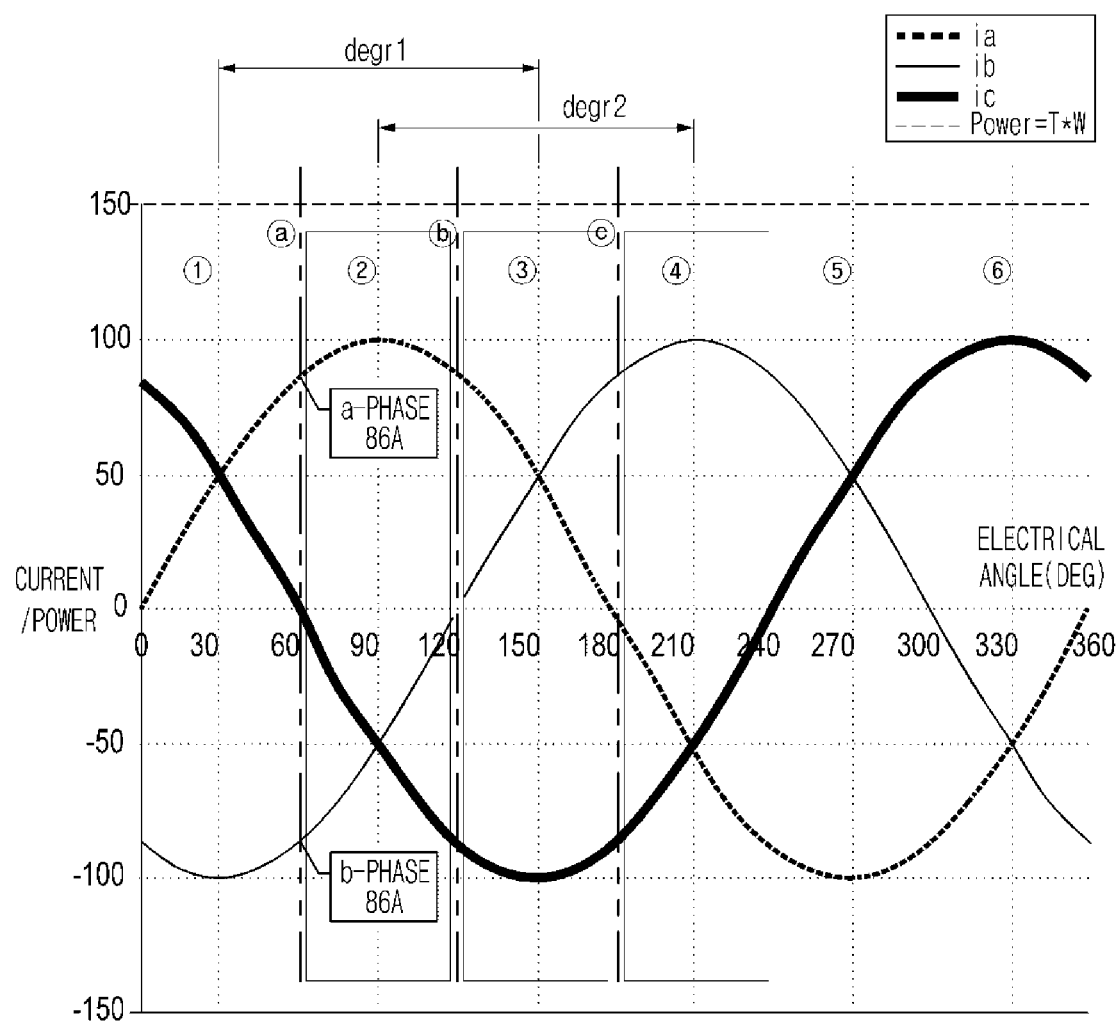
FIG. 5 shows currents flowing in a three-phase motor according to electrical angles of a motor.

FIG. 5 shows currents flowing in a three-phase motor according to electrical angles of a motor.

When a vehicle is stopped and the electrical angle of a motor is any one of 30(1), 90(2), and 150(3) degrees, excessive current 100A continuously flows at any phase of a 3-phase motor. Accordingly, it is required to change the electrical angle through the electrical angle-moving mode-executing step S370 described above.

For example, when the electrical angle of a motor in a stopped vehicle is 90 degrees, the electrical angle range may be set to a first electrical angle range degr1, and when the electrical angle of a motor is 150 degrees, the electrical angle range may be set to a second electrical angle range degr2.

The control method for a motor of an electronic brake according to an embodiment of the present invention can change the electrical angle of a motor within the electrical angle range described above, so it is possible to excessive current (100A) from flowing at any one phase of a 3-phase motor.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A control method for a motor of an electronic brake, the method comprising:
 a stop mode-starting step of starting a stop mode when a vehicle is stopped by a brake;
 an electrical angle-measuring step of measuring an electrical angle of a motor providing pressure to the brake in the stop mode;
 an electrical angle-calculating step of calculating a changed electrical angle using a predetermined electrical angle change and the electrical angle of the motor measured in the electrical angle-measuring step;
 a motor-controlling step of controlling a current flowing to the motor in accordance with the changed electrical angle; and
 a target pressure-generating step of generating a target pressure of the brake required for keeping the vehicle stopped in the stop mode.

2. The method of claim 1, further comprising a step of generating a target current of the motor corresponding to target pressure of the brake,
wherein the motor-controlling step performs PWM control on the motor in accordance with the target current and the changed electrical angle.

3. The method of claim 2, further comprising:
a current-checking step of checking a current error by comparing a feedback current of the motor with the target current of the motor; and
a pressure-checking step of checking a pressure error by comparing a feedback pressure of the brake with the target pressure of the brake.

4. A control method for a motor of an electronic brake, the method comprising:
a stop mode-starting step of starting a stop mode when a vehicle is stopped by a brake:
an electrical angle-measuring step of measuring an electrical angle of a motor providing pressure to the brake in the stop mode;
an electrical angle-calculating step of calculating a changed electrical angle using a predetermined electrical angle change and the electrical angle of the motor measured in the electrical angle-measuring step;
a motor-controlling step of controlling a current flowing to the motor in accordance with the changed electrical angle; and
an electrical angle-moving mode-selecting step of selecting and executing any one of a first electrical angle-moving mode and a second electrical angle-moving mode after the electrical angle-measuring step,
wherein the electrical angle-calculating step is performed in an electrical angle-moving mode selected from the first electrical angle-moving mode for calculating the changed electrical angle by subtracting the predetermined electrical angle change from the electrical angle of the motor and the second electrical angle-moving mode for calculating the changed electrical angle by adding the predetermined electrical angle change to the electrical angle of the motor.

5. The method of claim 1, wherein the target pressure of the brake is 90 bar or more.

6. A control method for a motor of an electronic brake, comprising:
a stop mode-starting step of starting a stop mode when a vehicle is stopped by a brake:
an electrical angle-measuring step of measuring an electrical angle of a motor providing pressure to the brake in the stop mode;
an electrical angle-calculating step of calculating a changed electrical angle using a predetermined electrical angle change and the electrical angle of the motor measured in the electrical angle-measuring step; and
a motor-controlling step of controlling a current flowing to the motor in accordance with the changed electrical angle,
wherein the method further comprises, before the stop mode-starting step:
a brake pedal angle-sensing step of sensing an angle of a brake pedal of the vehicle; and
a vehicle speed-sensing step of sensing a speed of the vehicle to check whether the vehicle has been stopped by the brake.

7. The method of claim 4, further comprising an electrical angle-moving mode-changing step that, after the motor-controlling step, changes an electrical angle-moving mode to the second electrical angle-moving mode when the electrical angle-moving mode is the first electrical angle-moving mode and the changed electrical angle exceeds 90 degrees from the measured electrical angle of the motor, and that changes the electrical angle-moving mode to the first electrical angle-moving mode when the electrical angle-moving mode is the second electrical angle-moving mode and the changed electrical angle exceeds 90 degrees from the measured electrical angle of the motor.

* * * * *